US008198366B2

(12) United States Patent
Hayata et al.

(10) Patent No.: US 8,198,366 B2
(45) Date of Patent: Jun. 12, 2012

(54) THERMOPLASTIC RESIN COMPOSITION AND MOLDED BODY

(75) Inventors: Yusuke Hayata, Chiba (JP); Akio Nodera, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 11/718,895

(22) PCT Filed: Oct. 25, 2005

(86) PCT No.: PCT/JP2005/019550
§ 371 (c)(1),
(2), (4) Date: May 9, 2007

(87) PCT Pub. No.: WO2006/051686
PCT Pub. Date: May 18, 2006

(65) Prior Publication Data
US 2008/0108754 A1 May 8, 2008

(30) Foreign Application Priority Data

Nov. 9, 2004 (JP) ................................. 2004-325001

(51) Int. Cl.
C08G 63/08 (2006.01)
C08G 77/448 (2006.01)
C08L 51/06 (2006.01)
C08F 283/02 (2006.01)
C08F 283/12 (2006.01)

(52) U.S. Cl. ....... 525/67; 525/92 E; 525/92 G; 525/450; 525/464; 525/468; 525/474

(58) Field of Classification Search .................. 528/196; 525/191
See application file for complete search history.

(56) References Cited

U.S. PATENT DOCUMENTS

| 3,189,662 | A | * | 6/1965 | Vaughn, Jr. ..................... 528/33 |
| 3,419,634 | A | * | 12/1968 | Vaughn, Jr. ..................... 528/29 |
| 3,821,325 | A | * | 6/1974 | Merritt, Jr. et al. ............... 28/14 |
| 3,832,419 | A | * | 8/1974 | Merritt, Jr. ..................... 528/21 |
| 4,617,346 | A | * | 10/1986 | Sonoda ........................... 525/68 |

(Continued)

FOREIGN PATENT DOCUMENTS
DE 4132079 A1 * 4/1993
(Continued)

OTHER PUBLICATIONS

Oral Translation of relevant portion of Ebert et al (DE 41 32 079 A1).*
(Continued)

*Primary Examiner* — Randy Gulakowski
*Assistant Examiner* — Mike M Dollinger
(74) *Attorney, Agent, or Firm* — Oblon, Spivak, McClelland, Maier & Neustadt, L.L.P.

(57) ABSTRACT

The present invention provides a thermoplastic resin composition containing (A) a resin mixture including (a-1) a polycarbonate resin in an amount of 45 to 97% by mass and (a-2) a fatty acid polyester in an amount of 55 to 3 % by mass, and (B) a rubber-like elastomer in an amount of 0.5 to 20 parts by mass per 100 parts by mass of the resin mixture, wherein component (B) is dispersed in an interface between ingredient (a-1) and ingredient (a-2) or in domains of ingredient (a-2). The composition has high impact characteristics and high fluidity and overcomes appearance defects such as pearl-like gloss and jetting marks.

6 Claims, 2 Drawing Sheets

U.S. PATENT DOCUMENTS

| | | | | |
|---|---|---|---|---|
| 4,654,400 | A | * | 3/1987 | Lohmeijer et al. ............... 525/64 |
| 4,778,855 | A | * | 10/1988 | Boutni et al. ................. 525/146 |
| 4,883,841 | A | * | 11/1989 | Riew et al. .................... 525/148 |
| 5,512,632 | A | * | 4/1996 | Serini et al. ..................... 525/67 |
| 5,599,854 | A | * | 2/1997 | Troy et al. ..................... 523/201 |
| 5,635,560 | A | * | 6/1997 | Kohler et al. ................... 525/67 |
| 5,814,702 | A | * | 9/1998 | Avakian et al. ................. 525/71 |
| 5,847,011 | A | * | 12/1998 | Terado et al. ................... 521/48 |
| 2004/0242803 | A1 | * | 12/2004 | Ohme et al. ................... 525/400 |

FOREIGN PATENT DOCUMENTS

| | | |
|---|---|---|
| JP | 06 009859 | 1/1994 |
| JP | 07 109413 | 4/1995 |
| JP | 09 279011 | 10/1997 |
| JP | 11 140292 | 5/1999 |
| JP | 11 279380 | 10/1999 |
| JP | 11279380 A * | 10/1999 |
| JP | 2000 103953 | 4/2000 |
| JP | 2002 114899 | 4/2002 |
| JP | 2005 048067 | 2/2005 |
| JP | 2005 120322 | 5/2005 |

OTHER PUBLICATIONS

Machine Translation of JP 2005-048067.*

U.S. Appl. No. 11/721,101, filed Jun. 7, 2007, Hayata, et al.

* cited by examiner

THERMOPLASTIC RESIN COMPOSITION AND MOLDED BODY

TECHNICAL FIELD

The present invention relates to a thermoplastic resin composition.

More specifically, the present invention is directed to a thermoplastic resin composition which has high impact characteristics and high fluidity and which overcomes appearance defects such as pearl-like gloss and jetting marks.

The thermoplastic resin composition is utilizable in the field of electric and electronic appliances, such as office automation equipment, information and communication appliances and home electric appliances, in the field of automobiles, in the field of construction, etc.

BACKGROUND ART

Attention is now paid to polycarbonate/polylactic acid alloy with respect to reduction of environmental load because the polylactic acid is a resin derived from plant.

Polycarbonate has a low fluidity. When alloyed with polylactic acid, however, polycarbonate can be effectively imparted with high fluidity because of the high fluidity of the polylactic acid.

In view of the structure of polylactic acid, it is considered that polylactic acid alloyed with polycarbonate scarcely generates a harmful gas when combusted. Thus, polylactic acid is a resin which is expected to be utilized in the field of office automation equipment and home electric appliances which require a flame retardancy standard.

Conventional polycarbonate/polyester alloy is lacking in fluidity though it has excellent heat resistance and chemical resistance. Thus, for the purpose of imparting high fluidity to polycarbonate, some measures such as alloying with a styrene-based resin and addition of a plasticizer are generally taken (for example, Patent Document 1).

A polycarbonate/polylactic acid alloy having pearl-like gloss and excellent fluidity and thermal and mechanical properties is known but there remains a room for improving the impact strength thereof (for example, Patent Document 2).

A polycarbonate/polyester alloy is generally lacking in impact resistance. Conventional alloying technology only provides an Izod impact strength of several kJ/m$^2$.

Therefore, it is necessary to further improve the impact resistance particularly in the field of automobiles which require excellent impact characteristics.

For the purpose of improving impact resistance, it is generally known to increase the interfacial strength of an alloy by improving the compatibility of a polymer alloy.

For example, a bisphenol A-type epoxy resin is used as a compatibilizer for polycarbonate/polyamide-polyether block copolymer (for example, Patent Document 3).

Further, an epoxy-modified styrene-butadiene-styrene copolymer (SBS) and a terpene-phenol resin are used as a compatibilizer for polycarbonate/styrene-type resin composition (for example, Patent Document 4).

With regard to the above-described systems, it is reported that the appearance defect is overcome and impact resistance is improved by controlling the conditions of interface between polycarbonate and a subsidiary material. However, no reports have been made with regard to polycarbonate/polylactic acid.

For the purpose of improving impact resistance of a polycarbonate alloy, addition of an acrylonitrile-butadiene-styrene block copolymer (ABS), an impact resisting polystyrene resin, etc. is also proposed (for example, Patent Document 5).

Any of the above-described systems, however, is lacking in fluidity. High fluidity is required for a thin wall article, which is a recent trend. Thus, there is a demand for developing new polycarbonate resin compositions.

For the purpose of imparting high fluidity to polycarbonate, a thought may occur to add a component which has better fluidity than polycarbonate and which is compatible with polycarbonate.

Polylactic acid which is a class of polyester has excellent affinity with polycarbonate. However, because polylactic acid has poor impact resistance, the range of its application is limited. For example, in the field of automobiles, an improvement of impact resistance is essential.

[Patent Document 1] Japanese Examined Patent Publication No. H07-068455

[Patent Document 2] Japanese Unexamined Patent Publication No. H07-109413

[Patent Document 3] Japanese Unexamined Patent Publication No. H07-026131

[Patent Document 4] Japanese Unexamined Patent Publication No. 2000-143912

[Patent Document 5] Japanese a Unexamined Patent Publication No. 2000-169692

DISCLOSURE OF INVENTION

It is an object of the present invention to improve the impact resistance of a polycarbonate resin/fatty acid polyester alloy without adversely affecting the fluidity thereof and to obviate appearance defects such as pearl-like gloss and formation of jetting marks.

The present inventors have made an earnest study, have found that a thermoplastic resin composition in which a rubber-like elastomer is compounded in a predetermined amount in a resin mixture containing specific proportions of a polycarbonate resin and fatty acid polyester can accomplish the above objects, and have completed the present invention.

Namely, the present invention pertains to:

1. A thermoplastic resin composition comprising (A) a resin mixture comprising (a-1) a polycarbonate resin in an amount of 45 to 97% by mass and (a-2) a fatty acid polyester in an amount of 55 to 3% by mass, and (B) a rubber-like elastomer in an amount of 0.5 to 20 parts by mass per 100 pats by mass of the resin mixture, wherein component (B) is dispersed in an interface between ingredient (a-1) and ingredient (a-2) or in domains of ingredient (a-2);

2. The thermoplastic resin composition as recited in 1 above, wherein the polycarbonate resin of ingredient (a-1) has a viscosity average molecular weight in the range of 10,000 to 40,000;

3. The thermoplastic resin composition as recited in 1 or 2 above, wherein the fatty acid polyester of ingredient (a-2) is polylactic acid and/or a copolymer of lactic acid and other hydroxycarboxylic acid;

4. The thermoplastic resin composition as recited in any one of 1 to 3 above, wherein the rubber-like elastomer of component (B) is a rubber-like elastomer containing at least one member selected from poly(methyl methacrylate), poly(ethyl methacrylate), poly(methyl acrylate) and poly(ethyl acrylate);

5. The thermoplastic resin composition as recited in any one of 1 to 4 above, wherein the rubber-like elastomer of component (B) has an average part ice diameter of 100 to 500 nm;

6. The thermoplastic resin composition as recited in any one of 1 to 5 above, wherein the composition is for office automation equipment, information and communication appliances, automobile parts or home electric appliances;

7. The molded body of a thermoplastic resin composition as recited in any one of 1 to 6 above.

By dispersing the rubber-like elastomer in an interface between the polycarbonate resin and the fatty acid polyester or in a domain of the fatty acid polyester, the impact resistance of the polycarbonate resin/fatty acid polyester is improved without adversely affecting the fluidity thereof. Further, since the form of the fatty acid polyester domains becomes uniform and stabilized, appearance defects such as pearl-like gloss and jetting marks may be obviated.

Moreover, the use of a polycarbonate-polyorganosiloxane copolymer can improve flame retardancy as well as shock resistance.

BEST MODE FOR CARRYING OUT THE INVENTION

Figure 1:
FIG. 1 is a transmission electron microscopic photograph in Example 2.

The present invention will be described in detail below.

In the thermoplastic resin composition of the present invention the polycarbonate resin being ingredient (a-1) of component (A) is not specifically limited. Although various polycarbonate resins may be used, a polymer having recurring units of the following general formula (1):

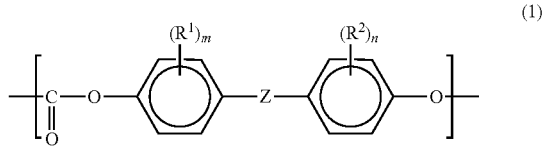

(1)

is suitably used.

In the above general formula (1), $R^1$ and $R^2$ are each a halogen atom (for example, chlorine, fluorine or iodine) or a $C_1$-$C_8$ alkyl group (for example, a methyl group, an ethyl group, a propyl group, an isopropyl group, various butyl groups (a n-butyl group, an isobutyl group, a sec-butyl group and a tert-butyl group), various pentyl groups, various hexyl groups, various heptyl groups or various octyl groups).

The symbols m and n are each an integer of 0 to 4. When m is 2 to 4, the plural $R^1$ groups may be the same with or different from each other. When n is 2 to 4, the plural $R^2$ groups may be the same with or different from each other.

The symbol Z represents a $C_1$-$C_8$ alkylene or $C_2$-$C_8$ alkylidene group (such as a methylene group, an ethylene group, a propylene group, a butylene group, a pentylene group, a hexylene group, an ethylidene group or an isopropylidene group, for example), a $C_5$-$C_{15}$ cycloalkylene or $C_5$-$C_{15}$ cycloalkylidene group (such as a cyclopentylene group, a cyclohexylene group, a cyclopentylidene group or a cyclohexylidene group, for example), a single bond, a bond of —$SO_2$—, —SO—, —S—, —O— or —CO—, or a bond of the following formula (2) or formula (2'):

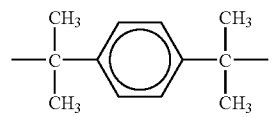

(2)

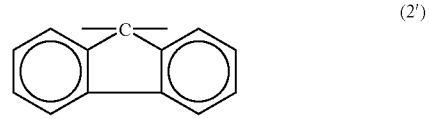

(2')

The above polymer may be generally easily prepared by reacting a dihydric phenol represented by the following general formula (3):

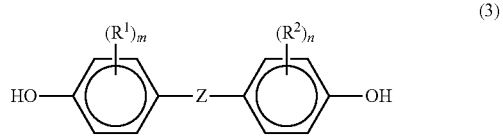

(3)

wherein $R^1$, $R^2$, Z, m and n have the same meaning as those of the above general formula (1), with a carbonate precursor such as phosgene.

That is, the polymer may be prepared, for example, by reaction of a dihydric phenol with a carbonate precursor such as phosgene in a solvent such as methylene chloride in the presence of a known acid acceptor and a known molecular weight controlling agent. Also, the polymer may be prepared by transesterification of a dihydric phenol with carbonate precursor such as a carbonic acid ester.

A variety of dihydric phenols may be mentioned as the dihydric phenol of the above general formula (3).

Particularly, 2,2-bis(4-hydroxyphenyl)propane (generally called bisphenol A) is preferred.

Examples of the dihydric phenols other than bisphenol A include bis(4-hydroxyphenyl)alkanes such as bis(4-hydroxyphenyl)methane, 1,1-bis(4-hydroxyphenyl)ethane and 1,2-bis(4-hydroxyphenyl)ethane; bis(4-hydroxyphenyl)cycloalkanes such as 1,1-bis(4-hydroxyphenyl)cyclohexane and 1,1-bis(4-hydroxyphenyl)cyclodecane; 4,4'-dihydroxydiphenyl; bis(4-hydroxyphenyl)oxide; bis(4-hydroxyphenyl)sulfide; bis 4-hydroxyphenyl)sulfone; bis-4-hydroxyphenyl)sulfoxide; and bis(4-hydroxyphenyl)ketone.

In addition to the above dihydric phenols, there may be mentioned hydroquinone.

The dihydric phenols may be used singly or as a mixture of two more thereof.

As the carbonic acid ester compound, there may be mentioned, for example, diary carbonates such as diphenyl carbonate and dialkyl carbonates such as dimethyl carbonate and diethyl carbonate.

The polycarbonate resin may be a homopolymer using one of the above-mentioned dihydric phenols or may be a copolymer using two or more of the above-mentioned dihydric phenols.

Further, the polycarbonate resin may be a thermoplastic, randomly branched polycarbonate resin obtainable by using a polyfunctional aromatic compound together with the above-mentioned dihydric phenol.

Specific examples of such a polyfunctional aromatic compound, which is generally called chain branching agent, include 1,1,1-tris(4-hydroxyphenyl)ethane, α,α',α"-tris(4-hydroxyphenyl-1,3,5-triisopropylbenzene, 1-[α-methyl-α-(4'-hydroxyphenyl)ethyl]-4-[α,α'-bis(4"-hydroxyphenyl)ethyl]benzene, phlorogrucine, trimellitic acid or isatin bis(o-cresol).

The polycarbonate resin having the above characteristics is commercially available as, for example, an aromatic polycarbonate resin such as TAFLON FN3000A, FN2500A, FN2200A, FN1900A, FN1700A and FN1500A trademarks, manufactured by Idemitsu Kosan Co., Ltd.).

As the polycarbonate resin used in the present invention, there may be mentioned, in addition to a homopolymer prepared using the above-mentioned dihydric phenol by itself, a polycarbonate-polyorganosiloxane copolymer (hereinafter referred to as PC-POS copolymer for brevity) which is preferable. For reasons of higher impact resistance and improved flame retardancy.

Although there are various types of PC-POS copolymers, preferred one is a copolymer composed of a polycarbonate moiety containing recurring units having a structure represented by the formula (1):

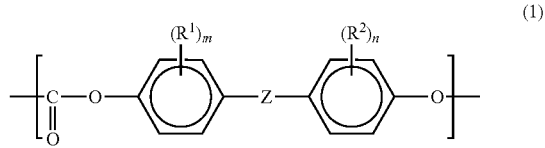

wherein $R^1$, $R^2$, Z, m and n have the same meaning as above, and a polyorganosiloxane moiety containing recurring units having a structure represented by the following general formula (4):

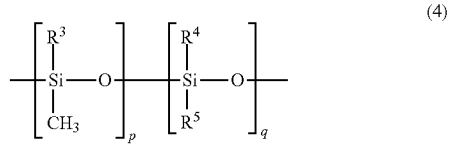

wherein $R^3$, $R^4$ and $R^5$ are each a hydrogen atom, a $C_1$ to $C_8$ alkyl group (for example, a methyl group, an ethyl group, a propyl group, a n-butyl group or an isobutyl group) or a phenyl group, and p and q are each an integer of 0 or at least 1, provided that a total of p and q is an integer of at least 1.

Here, the degree of polymerization of the polycarbonate moiety is preferably from 3 to 100, and the degree of polymerization of the polyorganosiloxane moiety is preferably from 2 to 500.

The PG-POS copolymer described above is a block copolymer composed of the polycarbonate moiety having the recurring units represented by the above-mentioned general formula (1) and the polyorganosiloxane moiety having the recurring units represented by the above-mentioned general formula (4).

Such a PC-POS copolymer can be manufactured, for example, by dissolving a previously prepared polycarbonate oligomer (hereinafter, referred to as PC oligomer for brevity), which is to constitute the polycarbonate moiety, and a polyorganosiloxane (for example, polydialkylsiloxane such as polydimethylsiloxane (PDMS) and polydiethylsiloxane, and polymethylphenylsiloxane, etc.), which is to constitute the polyorganosiloxane moiety and which has a terminal reactive group, in a solvent such as methylene chloride, chlorobenzene or chloroform, and by subjecting the resulting solution, after the addition of a solution of bisphenol in an aqueous sodium hydroxide, to an interfacial polycondensation in the presence of a catalyst such as triethylamine, trimethylbenzylammonium chloride, etc.

A PC-POS copolymer manufactured by a method disclosed in Japanese Patent Publication No. S44-30105 or Japanese Patent Publication No. S45-20510 can also be used.

The PC oligomer having the recurring units represented by the general formula (1) car be easily manufactured by a solvent method, wherein, a dihydric phenol represented by the above general formula (3) is reacted with a carbonate precursor such as phosgene and a carbonic acid ester compound in a solvent such as methylene chloride in the presence of a known acid-receptor and a known molecular weight controlling agent.

For example, the PC oligomer can be manufactured by reacting a dihydric phenol with a carbonate precursor such as phosgene or by transesterifying a carbonate precursor such as carbonic acid ester compound with a dihydric phenol in a solvent such as methylene chloride in the presence of a known acid-receptor and a known molecular weight controlling agent.

As the carbonic acid ester or pound, there may be used the compounds similar to those described above. As the molecular weight controlling agent, there may be used the or pounds similar to those described below.

The PC oligo mer used in manufacture of the PC-POS copolymer may be a homopolymer obtained by using one of the dihydric phenols described above, or a copolymer obtained by using two or more of them.

Further, the PC oligomer may be a thermoplastic, randomly branched polycarbonate resin obtained using a polyfunctional aromatic compound in combination with the dihydric phenol described above.

In addition, the polycarbonate resin used in the present invention may suitably be a polycarbonate resin having a terminal group represented by the general formula (5):

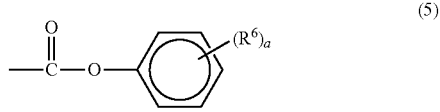

wherein $R^6$ is a $C_1$ to $C_{35}$ alkyl group and a is an integer of 0 to 5.

In general formula (5), $R^6$ is a $C_1$ to $C_{35}$ alkyl group which may be linear or branched.

The position of the linkage may be any of p-position, m-position and o-position but is preferably a p-position.

The polycarbonate resin of the general formula (5) may be easily prepared by reacting a dihydric phenol with phosgene or a carbonic acid ester compound.

For example, the polycarbonate resin can be produced by reacting a dihydric phenol with a carbonate precursor such as phosgene in the presence of a catalyst such as triethylamine and a specific terminating agent or by transesterifying a carbonate precursor such as diphenyl carbonate with a dihydric phenol in a solvent such as methylene chloride.

The dihydric phenol may be a compound similar to or different from the compound represented by the above general formula (3).

The polycarbonate resin may be a homopolymer obtained by using one of the dihydric phenols described above, or a copolymer obtained by using two or more of them.

The polycarbonate resin may also be a thermoplastic, randomly branched polycarbonate which is produced from the above dihydric phenol and a polyfunctional aromatic compound.

As the carbonic acid ester compound, there may be mentioned diaryl carbonates such as diphenyl carbonate and dialkyl carbonates such as dimethyl carbonate and diethyl carbonate.

As the terminating agent, a phenol compound capable of forming a terminal group represented by formula (5) can be used.

Namely, the phenol compound is represented by the general formula (6):

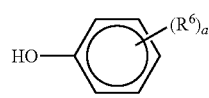

(6)

wherein $R^6$ has the same meaning as above.

As the alkylphenol, there may be mentioned phenol, p-cresol, p-tert-butylphenol, p-tert-octylphenol, p-cumylphenol, p-nonylphenol, docosylphenol, tetracosylphenol, hexacosylphenol, octacosylphenol, triacontylphenol, dotriacontylphenol, and tetratriacontylphenol.

These alkylphenols may be used singly or in combination of two or more thereof.

These alkylphenols may be used in conjunction with another phenol compound, etc. as long as the effect of the present invention is not adversely affected.

The polycarbonate resin produced by the above method virtually has, at its one end or both ends of the molecule, a terminal group represented by the general formula (5).

The polycarbonate resin used as ingredient (a-1) has a viscosity average molecular weight of generally 10,000 to 40,000.

When the viscosity average molecular weight is 10,000 or more, the thermoplastic resin composition obtained gives sufficient heat resistance and mechanical properties. When the viscosity average molecular weight is 40,000 or less, the thermoplastic resin composition obtained gives improved mold processability.

The viscosity average molecular weight of the polycarbonate resin is preferably 14,000 to 25,000, more preferably 15,000 to 22,000.

The viscosity average molecular weight (Mv) is determined as follows: The viscosity of a solution of the polycarbonate resin in methylene chloride at 20° C. is measured using an Ubbelohde viscometer, from which the intrinsic viscosity [η] is determined. The Mv is calculated from the following equation:

$$[\eta]=1.23\times10^{-5}Mv^{0.83}$$

In the thermoplastic resin composition of the present invention, polylactic acid or a copolymer of lactic acid with hydroxycarboxylic acid may be suitably used as the fatty acid polyester of ingredient (a-2) of component (A).

Polylactic acid may be synthesized from a cyclic dimer of lactic acid which is generally called lactide. Methods for producing polylactic acid are disclosed in U.S. Pat. Nos. 1,995,970, 2,362,511, 2,683,136, etc.

A copolymer of lactic acid with other hydroxycarboxylic acid may be generally synthesized by ring-open polymerization of lactide and a cyclic ester intermediate of a hydroxycarboxylic acid. Methods for producing such a copolymer are disclosed in, for example, U.S. Pat. Nos. 3,635,956, 3,797, 499, etc.

When a lactic acid-based resin is prepared by direct dehydrative polycondensation rather than ring-open polymerization, lactic acid and, if necessary other hydroxycarboxylic acid are subjected to azeotropic dehydrative condensation preferably in an organic solvent, particularly a phenyl ether solvent. In this case, it is particularly preferred that the polymerization is carried out by a method in which the solvent obtained by azeotropic distillation is treated for the removal of water and the resulting substantially water-free solvent is returned to the reaction system. The lactic acid resin thus obtained has a degree of polymerization suitable for the present invention.

As the lactic acid used as the raw material may be L-lactic acid, D-lactic acid, a mixture thereof or lactide which is a dimer of lactic acid.

As other hydroxyl carboxylic acids used in conjunction with lactic acid, there may be mentioned glycol acid, 3-hydroxybutyric acid, 4-hydroxybutyric acid, 4-hydroxyvaleric acid, 5-hydroxyvaleric acid and 6-hydroxycaproic acid. Fuher, cyclic ester intermediates of hydroxycarboxylic acids, such as glycolide being a diner of glycolic acid and ε-caprolactone being a cyclic ester of 6-hydroxycaproic acid, may be also used.

In the production of the lactic acid resin, it is possible to add a suitable a molecular weight controlling agent, a branching agent and other modifying agents.

The lactic acids and hydroxycarboxylic acids a component of the copolymer may be used singly or in combination of two or more thereof. Further, two or more lactic acid resins may be used as a mixture.

The fatty acid polyester of ingredient (a-2) in the present invention preferably has a high molecular weight from the standpoint of thermal and mechanical properties and, thus, preferably has a weight average molecular weight of 30,000 or more.

As the fatty acid polyester, polylactic acid is preferred from the standpoint of durability and rigidity.

In the resin mixture of the present invention, the proportion, in terms of mass ratio, of the polycarbonate resin as ingredient (a-1) to the fatty acid polyester as ingredient (a-2) is in the range of 45:55 to 97:3, preferably 60:40 to 90:10.

When the proportion of the ingredients (a-1) and (a-2) is within the above range, the thermoplastic resin composition of the present invention has good mechanical strengths, heat resistance and fluidity.

In the thermoplastic resin composition of the present invention, the rubber-like elastomer of component (B) is used for the purpose of improving the impact resistance and is preferably a core-shell type graft rubber-like elastomer from the standpoint of improved impact resistance and shape stability of the fatty acid polyester, in particular the polylactic acid domains.

The graft rubber-like elastomer preferably has a shell having an acrylic structure which has high affinity with polylactic acid so that it can be selectively dispersed in the fatty acid polyester, particularly in the polylactic acid domains.

The rubber-like elastomer has an average particle diameter of 100 to 500 nm, preferably 200 to 400 nm.

When the average particle diameter of the rubber-like elastomer is within the above range, the elastomer has excellent dispersibility so that the effect for improving the impact resistance is high.

The core-shell type graft rubber-like elastomer has a two-layer structure composed of a core and a shell.

Suitably used is a graft rubber-like elastomer which is in the form of powder (in the form of particles) and is composed of a soft rubber-like core and a hard resinous shell provided on the surface of the core part.

A large portion of the core-shell type graft rubber-like elastomer can maintain its original powdery shape even melt-blended with the resin mixture of the polycarbonate resin and the fatty acid polyester and, therefore, can be uniformly dispersed in an interface between the polycarbonate resin and the polylactic acid or in domains of the polylactic acid. Therefore, appearance defects such as pearl-like gloss and jetting arks can be obviated.

As the core-shell type graft rubber-like elastomer, a product obtained by polymerizing one or at least two vinyl monomers such as styrene in the presence of one or at least two graft rubber-like poly ers obtainable from monomers composed mainly of, for example, alkyl acylate or alkyl methacrylate, and dimethylsiloxane is suitably used.

As the alkyl acrylates and alkyl methacrylates, there may be used those having $C_2$ to $C_{10}$ alkyl groups. For example, a product obtainable by using methyl acrylate, ethyl acrylate, butyl acrylate, 2-ethylhexyl acrylate, n-octyl acrylate, methyl methacrylate, ethyl methacrylate, butyl methacrylate, 2-ethylhexyl methacrylate or n-octyl methacrylate is preferred. Particularly preferred is a product obtainable by using methyl acrylate, ethyl acylate, methyl methacrylate or ethyl methacrylate.

The elastomer obtained using the monomer component mainly composed of alkyl acrylate or the like may be preferably a copolymer produced by reacting 70% by weight or more of an alkyl acrylate with 30% by weight or less of another vinyl monomer copolymerizable with the alkyl acylate, such as methyl methacylate, acrylonitrile, vinyl acetate and styrene.

Further, the copolymer may be cross-linked with a polyfunctional compound such as divinylbenzene, ethylene dimethacrylate, triallyl cyanurate and triallyl isocyanurate.

The rubber-like elastomer may be a product obtained by polymerizing or copolymerizing an aromatic vinyl compound, such as styrene α-methylstyrene, an acrylic ester such as methyl acrylate and ethyl acylate, or a methacylic ester such as methyl methacrylate and ethyl methacylate in the presence of the graft rubber-like polymer.

Further, these monomers may be used a together with another vinyl monomer, such as a vinyl cyanide compound, e.g. acrylonitrile or methacrylonitrile, or a vinyl ester compound, e.g. vinyl acetate or vinyl propionate, to produce a copolymer.

These polymers and copolymers may be a product obtained by various methods such as bulk polymerization, suspension polymerization and emulsion polymerization. Among them, polymers and copolymers obtained by the emulsion polymerization are particularly preferably used.

Further, as the core-shell type graft rubber-like elastomer, a MAS resin elastomer obtained by graft copolymerizing 20 to 40% by mass of styrene and methyl methacylate with 60 to 80% by mass of n-butyl acrylate polymer may be used.

Additionally, a composite rubber graft copolymer produced by graft copolymerizing at least one vinyl monomer with a composite rubber having an average particle size of about 0.01 to 1 μm and having a structure in which 5 to 95% by mass of a polysiloxane rubber component is unseparably entangled with 95 to 5% by mass of a poly(meth)acrylate rubber component.

Among those core-shell type graft rubber-like elastomers having various structures, commercially available are KM-357P (manufactured by Rohm & Haas Company), and METABLEN W450A, METABLEN W529, METABLEN S2001, METABLEN C223, KS3406 (manufactured by Mitsubishi Rayon Co., Ltd.).

Incidentally, rubber-like elastomers such as polyamide-polyether block copolymers, which have not a core-shell structure, have a large shape factor which has a great influence upon the impact resistance and, therefore, are not preferable for the purpose of the present invention.

The compounding amount of the rubber-like elastomer being component (B) is 0.5 to 20 parts by mass, preferably 1 to 15 parts by mass, more preferably 3 to 1 parts by mass, per 100 parts by mass of the resin mixture being component A.

When the compounding amount is within the above-described range, the impact resistance is improved without adversely affecting the fluidity improving effect of the polylactic acid.

The present invention also provides a molded body of the above-described resin composition.

The thermoplastic resin composition of the present invention may be obtained by blending and kneading the above ingredient (a-1), ingredient (a-2), component (B) and, if necessary, other ingredients.

Such blending and kneading may be carried out in a customarily employed method, for example, by using a method employing a ribbon blender, a Henschel mixer, a Banbury mixer, a drum tumbler, a single-axis screw extruder, a double-axis screw extruder, a co-kneader, multi-axis screw extruder, or the like.

The heating temperature for the kneading is generally selected from a range of 220 to 260° C.

The temperature at which the thermoplastic resin composition of the present invention is molded is also generally selected from a range of 220 to 260° C.

EXAMPLES

The present invention will be next described in more detail with reference to several examples. However the present invention is not limited to those examples in any way.

Preparation Example 1

[Production of PC-2; PC-PDMS (polydimethylsiloxane) Copolymer]
(1) Preparation of PC Oligomer In 400 liters of a 5 mass % aqueous sodium hydroxide solution were dissolved 60 kg of bisphenol A to obtain an aqueous sodium hydroxide solution of bisphenol A. Then, the aqueous sodium hydroxide solution of bisphenol A maintained at room temperature and methylene chloride were introduced through an orifice plate at flow rates of 138 liter/hour and 69 liter/hour, respectively into a tubular reactor having an inside diameter of 10 mm and a tube length of 10 m, into which phosgene was co-currently blown at a flow rate of 10.7 kg/hour so that the reaction was continuously carried out for 3 hours.

The tubular reactor used herein was a double-walled tube and cooling water was passed through its jacket part so that the temperature of the reaction liquid discharged therefrom was maintained at 25° C.

The pH of the discharged liquid was adjusted between 10 and 11.

The thus obtained reaction liquid was allowed to quiescently stand. An aqueous phase was separated and removed to collect a methylene chloride phase (220 liters) and to obtain PC oligomer (concentration: 317 g/liter).

The thus obtained PC oligomer was found to have a degree of polymerization ranging from 2 to 4 and a concentration of chloroformate groups of 0.7 mol/liter.

(2) Production of Reactive PDMS 1,483 g of octamethylcyclotetrasiloxane, 96 g of 1,1,3,3-tetramethyldisiloxane and 35 g of 86 mass % sulfuric acid were mixed and stirred at room temperature for 17 hours.

Then, the oil phase was separated and 25 g of sodium hydrogen carbonate were added thereto. The mixture was stirred for 1 hour.

After filtration, the oil phase was vacuum distilled at 150° C. under a pressure of 3 torr (400 Pa) to remove low boiling point components and to obtain an oily product.

294 g of the oily product obtained above were added to a mixture of 60 g of 2-allylphenol and 0.0014 g of platinum in the form of a platinum chloride-alcoholate complex at a temperature of 90° C.

The resulting mixture was stirred for 3 hours while maintaining the temperature between 90 and 115° C.:

The reaction product was extracted with methylene chloride and the extract was washed 3 times with an 80 mass % aqueous methanol to remove excess 2-allylphenol.

The product was dried over anhydrous sodium sulfate and then the solvent was removed under vacuum by heating up to 115° C.

The thus obtained reactive PDMS terminated with phenol was found to have 30 repeating dimethylsilanoxy units by NMR measurement (3) Production of PC-PDMS Copolymer 138 g of reactive PDMS obtained in (2) above were dissolved in 2 liters of methylene chloride to which 10 liters of PC oligomer obtained in (1) above were mixed.

To the resulting mixture, a solution of 26 g sodium hydroxide dissolved in 1 titer of water and 5.7 milliliters of triethylamine were added, and the mixture was reacted at room temperature for 1 hour with stirring at 500 rpm.

After completion of the reaction, a solution of 600 g of bisphenol A dissolved in 5 liters of a 5.2 mass % aqueous sodium hydroxide solution, 8 liters of methylene chloride and 96 g of p-tert-butylphenol were added to the above reaction system and the mixture was reacted at room temperature for 2 hours with stirring at 500 rpm.

After completion of the reaction, 5 liters of methylene chloride were added to the reaction mixture. Thereafter, the mixture was washed successively with 5 liters of water, 5 liters of an alkali (0.03 mol/liter aqueous sodium hydroxide solution) 5 liters of an acid (0.2 mol/liter hydrochloric acid) and 5 liters of water (twice) in this order. Finally, methylene chloride was removed to obtain PC-PDMS copolymer in the form of flakes.

The thus obtained PC-PDMS copolymer was vacuum dried at 120° C. for 24 hours.

The copolymer was found to have a viscosity-average molecular weight of 17,000 and a PDMS content of 4.0 mass %.

The PDMS content was determined as follows:

The content was determined on the basis of an intensity ratio of the peak at 1.7 ppm attributed to the methyl group of the isopropyl group of bisphenol A to the peak at 0.2 ppm attributed to the methyl group of the dimethylsiloxane in $^1$H-NMR.

Preparation Example 2

[Production of PC-3]

(1) Preparation of Alkylphenol (a)

Into a reactor equipped with a baffle and agitating blades were charged reaction raw materials including 300 parts by mass of phenol and 110 parts by mass of a 1-docosene (phenol/olefin molar ratio=9/1), and 11 parts by mass of a strongly acidic polystyrene-based sulfonic acid type cation exchange resin (Amberlyst 15, available from Rohm & Haas Co., Ltd.) as a catalyst. The mixture was then reacted at 120° C. for 3 hours with stirring.

After completion of the reaction, the product was refined by vacuum distillation to obtain alkylphenol (a).

The number of car on atoms of the alkyl group of alkylphenol (a) obtained was found to be 22.

(2) Preparation of PC Oligomer

In 400 liters of a 5 mass % aqueous sodium hydroxide solution were dissolved 60 kg of bisphenol A to obtain an aqueous sodium hydroxide solution of bisphenol A.

Then, the aqueous sodium hydroxide solution of bisphenol A maintained at room temperature and methylene chloride were introduced through an orifice plate at flow rates of 138 liter/hour and 69 liter/hour, respective y, into a tubular reactor having an inside diameter of 10 mm and a tube length of 10 m, into which phosgene was co-currently blown at a flow rate of 10.7 kg/hour so that the reaction was continuously carried out for 3 hours.

The tubular reactor used herein was a double-walled tube, and cooling water was passed through its jacket pa so that the temperature of the reaction liquid discharged therefrom was maintained at 25° C.

The pH of the discharged liquid was adjusted between 10 and 11.

The thus obtained reaction liquid was allowed to quiescently stand. An aqueous phase was separated and removed to collect a methylene chloride phase (220 liters) and to obtain PC oligomer (concentration: 317 g/liter).

The thus obtained PC oligomer was found to have a degree of polymerization ranging from 2 to 4 and a concentration of chloroformate groups of 0.7 mol/liter.

(3) End-Modified Polycarbonate Resin

In a vessel having an inside volume of 50 liters and equipped with a stirrer, 10 liters of PC oligomer obtained in (2) above were placed, in which were dissolved 249 g of alkylphenol (a) obtained in (1) above.

To the resulting mixture, an aqueous sodium hydroxide solution (53 g of sodium hydroxide dissolved in 1 liter of water) and 5.8 milliliters of triethylamine were added and the mixture was reacted for 1 hour with stirring at 300 rpm.

Thereafter, the above reaction system was mixed with a solution of bisphenol A dissolved in an aqueous sodium hydroxide solution (bisphenol: 720 g, sodium hydroxide: 412 g, water: 5.5 liters and, 8 liters of methylene chloride were added thereto. The mixture was then reacted or 1 hour with stirring at 500 rpm.

After completion of the reaction, 7 liters of methylene chloride and 5 liters of water were added to the reaction mixture. The mixture was stirred for 10 minutes at 500 rpm and then allowed to stand quiescently for the separation into an organic phase and an aqueous phase.

The organic phase thus obtained was washed successively with 5 liters of an alkali (0.03 mol/liter NaOH), 5 liters of an acid (0.2 mol/liter HCl) and 5 liters of water (twice) in this order.

Thereafter methylene chloride was removed by distillation to obtain a polymer in the form of flakes.

The polymer was found to have a viscosity-average molecular weight of 17,500.

Examples 1 to 9 and Comparative Examples 1 to 8

Ingredients and components were blended in the proportions shown in Table 1-1 and Table 1-2, fed to a vented double-screw extruder (model TEM35-manufactured by Toshiba Machine Co., Ltd), melted and kneaded therein at 240° C., and then pelletized.

In all Examples and Comparative Examples a phosphorus-type antioxidant (trademark: ADEKASTAB PEP36 manufactured by Adeka Corporation) and a phenol-type antioxidant (trademark: IRGANOX 1076 manufactured by Chiba Speciality Chemicals Inc.) were added as a stabilizing agent each in amount of 0.1 part by mass.

The resulting pellets were dried at 100° C. for 10 hours and then molded by injection molding at a molding temperature of 240° C. of the molds: 40° C.) to obtain test pieces.

Each of the test pieces was evaluated for respective properties according to the various evaluation tests described below. The results are shown in Table 1-1 and Table 1-2.

Figure 2:
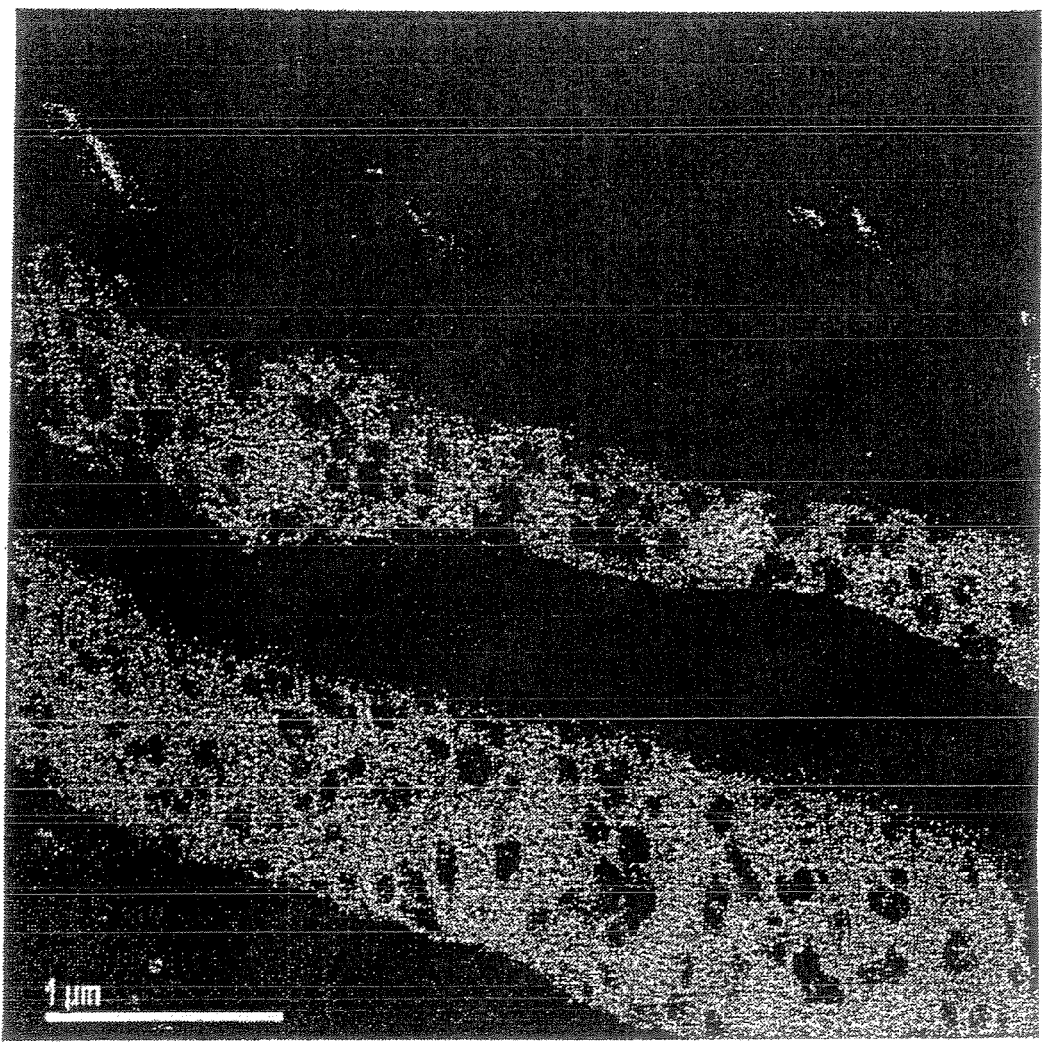
FIG. 2 is a transmission electron microscopic photograph in Example 6.

Photographs of the products of Examples 2 and 6 were taken using a transmission electron microscope (TEM) and were as shown in FIGS. 1 and 2. In the photographs, black pattern indicates the polycarbonate resin, white pattern indicates the polylactic acid, and black spots in the white pattern indicate the rubber-like elastomer.

The ingredients and components used for blending and performance evaluation methods are as follows:
[Compounded Ingredients and Components]
ingredient (a-1):
  (a): (PC-1); polycarbonate resin, FN1700A (manufactured by Idemitsu Kosan Co., Ltd. bisphenol A polycarbonate resin, viscosity-average molecular weight: 17,500 molecular terminal: p-tert-butylphenol residue)
  (b): (PC-2); polycarbonate-polydimethysiloxane bisphenol A polycarbonate resin (PC-PDMS), (see Preparation Example 1)
  (c): (PC-3); end-modified polycarbonate resin (see Preparation Example 2) Ingredient (a-2):
  PLA; polylactic acid, H100 (manufactured by Mitsui Chemical Corporation) Component B:
  (a) Rubber-like elastomer-1; acryl/butyl acrylate elastomer, W450A, manufactured by Mitsubishi Rayon Co., Ltd.
  (b) Rubber-like elastomer-2; glycidyl methacrylate-modified elastomer, KS3406, manufactured by Mitsubishi Rayon Co., Ltd.
  (c) Rubber-like elastomer-3 polyamide/polyether block copolymer. PEBAX4011, manufactured by Elfatochem Japan Inc.

[Performance Evaluation Method]
(1) IZOD (IZOD Impact Strength):
   Measured in accordance with ASTM D256 using a test piece with a thickness of 3.13 mm at 23° C.; unit: $kJ/m^2$
(2) Fluidity (SFL): measured using a molding temperature of 260° C., a mold temperature of 80° C., a wall thickness of 2 mm, a width of 10 mm, an injection pressure of 7.85 MPa; unit: cm
(3) Flame Retardancy: UL94 standard; test piece thickness: 3.0 mm; vertical burning tests was carried according to Subject 94 of Underwriters Laboratories, Inc.
(4) Appearance of molded body: square plate of 100×100×2 mm was prepared by molding and the sample was evaluated with naked eyes according to the following ratings:
B: slight uneven flow
A: no uneven flow

TABLE 1-1

| | | | | Example | | | | | | | | |
|---|---|---|---|---|---|---|---|---|---|---|---|---|
| | | | | 1 | 2 | 3 | 4 | 5 | 6 | 7 | 8 | 9 |
| Compounding amount (part by mass) | (a-1) | (a) | PC-1 | 95 | 70 | 50 | 40 | 40 | | | | 30 |
| | | (b) | PC-2 | | | | | 30 | 40 | 70 | 70 | 48 |
| | | (c) | PC-3 | | | | | | | | | 20 |
| | (a-2) | | PLA | 5 | 30 | 50 | 30 | 20 | 30 | 30 | 52 | 50 |
| | (B) | | Rubber-like elastomer-1 | 3 | 3 | 5 | 5 | | | | | |
| | | | Rubber-like elastomer-2 | | | | | 2 | 3 | 15 | 4 | 10 |
| | | | Rubber-like elastomer-3 | | | | | | | | | |
| Evaluation | | | Izod impact strength [$kJ/m^2$] 23° C. | 85 | 70 | 60 | 82 | 72 | 78 | 80 | 65 | 74 |
| | | | Fluidity SFL (cm) | 30 | 55 | 80 | 48 | 40 | 55 | 45 | 85 | 70 |
| | | | Flame retardancy UL94 3 mm | V-2 | NG | NG | V-2 | V-2 | V-2 | V-2 | V-2 | NG |
| | | | Appearance of product | B | B | A | A | A | A | A | A | A |

TABLE 1-2

| | | | | Comparative Example | | | | | | | |
|---|---|---|---|---|---|---|---|---|---|---|---|
| | | | | 1 | 2 | 3 | 4 | 5 | 6 | 7 | 8 |
| Compounding amount (part by mass) | (a-1) | (a) | PC-1 | 95 | 50 | | 40 | 40 | 40 | | |
| | | (b) | PC-2 | | | 70 | 30 | | | 30 | 70 |
| | | (c) | PC-3 | | | | | | | | 40 |
| | (a-2) | | PLA | 5 | 50 | 30 | 30 | 60 | 30 | 30 | 60 |
| | (B) | | Rubber-like elastomer-1 | | | | 0.3 | | | | |
| | | | Rubber-like elastomer-2 | | | 30 | | 5 | | | 10 |

TABLE 1-2-continued

|  |  | Comparative Example | | | | | | | |
|---|---|---|---|---|---|---|---|---|---|
|  |  | 1 | 2 | 3 | 4 | 5 | 6 | 7 | 8 |
|  | Rubber-like elastomer-3 |  |  |  |  |  | 5 | 3 |  |
| Evaluation | Izod impact strength [kJ/m$^2$] 23° C. | 5 | 2 | 80 | 5 | 5 | 25 | 25 | 10 |
|  | Fluidity SFL (cm) | 28 | 82 | 25 | 50 | 90 | 42 | 45 | 70 |
|  | Flame retardancy UL94 3 mm | V-2 | NG | NG | V-2 | NG | NG | NG | NG |
|  | Appearance of product | Pearl-like gloss | B | A | Pearl-like gloss | A | Jetting marks | Jetting marks | Significant shrinkage |

From Table 1-1 and Table 1-2, the following facts are revealed:

(1) Examples 1 to 9

By compounding a resin mixture of polycarbonate resin and polylactic acid with a core-shell type rubber-like elastomer, Izod impact strength significantly improves.

As will be evident from FIGS. 1 and 2, when the shell is made of a rubber-like elastomer having an acrylic structure, the rubber-like elastomer is dispersed in an interface between the polycarbonate resin and polylactic acid, especially in polylactic acid domains. Therefore, the shape of the polylactic acid domains becomes uniform and is stabilized. Accordingly, it is possible to obtain a thermoplastic resin composition which is excellent in impact strength and which retains the high fluidity of the polycarbonate resin/polylactic acid. Further, the molded body obtained from such a composition has good appearance.

The core-shell type rubber-like elastomer is highly effective to improve the impact resistance and the compounding amount thereof is considered to be reduced to a small amount.

By using the polycarbonate-polyorganosiloxane copolymer, not only the impact resistance but also the flame retardancy is improved. Further, it is possible to obtain a molded body having good appearance.

(2) Comparative Example 1, Comparative Example 2 and Comparative Example 4

When the rubber-like elastomer is used in a small amount or is not used at all the impact resistance becomes poor.

(3) Comparative Example 3

When the rubber-like elastomer is used in an amount of 30% by mass or more, the fluidity is significantly reduced.

(4) Comparative Example 5 and Comparative Example 8

When the compounding amount of polylactic acid exceeds 50% by mass, the impact resistance improving effect by compounding the rubber-like elastomer is small.

(5) Comparative Example 6 and Comparative Example 7

When the rubber-like elastomer does not have an acrylic structure, the impact resistance improving effect is small when used in the same amount. Therefore, the shape of the polylactic acid domains is not stabilized. As a consequence, jetting marks are formed due to poor fluidity.

[Industrial Applicability]

According to the present invention, it is possible to obtain a thermoplastic resin composition which has high impact characteristics and high fluidity and which overcomes appearance defects such as pearl-like gloss and jetting marks. The thermoplastic resin composition is utilizable in the field of electric and electronic appliances, such as office automation equipment, information and communication appliances and home electric appliances, in the field of automobiles, in the field of construction, etc.

The invention claimed is:

1. A thermoplastic resin composition, comprising:

(A) a resin mixture comprising (a-1) a polycarbonate resin in an amount of 60 to 97% by mass and (a-2) a polylactic acid homopolymer in an amount of 40 to 3% by mass; and (B) a core-shell type graft rubber-like elastomer, the rubber-like elastomer being present in an amount of 0.5 to 20 parts by mass per 100 parts by mass of the resin mixture (A);

wherein:

component (B) is dispersed in an interface between ingredient (a-1) and ingredient (a-2), the thermoplastic resin composition does not have a pearl-like gloss;

the polycarbonate resin comprises:

a polycarbonate-polyorganosiloxane copolymer resin having a recurring unit of the following formula (1):

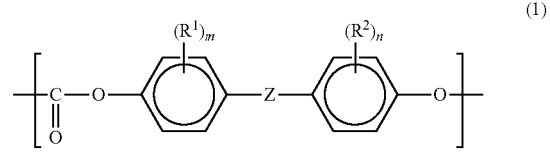

where:

R$^1$ and R$^2$ are each a halogen atom or a C$_1$-C$_8$ alkyl group, m and n are each an integer of 0 to 4, when m is 2 to 4, the plural R$^1$ groups may be the same as or different from each other, when n is 2 to 4, the plural R$^2$ groups may be the same as or different from each other, and Z represents a $C_1$-$C_8$ alkylene or $C_2$-$C_8$ alkylidene group, a $C_5$-$C_{15}$ cycloalkylene or $C_5$-$C_{15}$ cycloalkylidene group, a single bond, a bond of —$SO_2$—, —SO—, —S—, —O— or —CO—, or a bond of the following formula (2) or formula (2'):

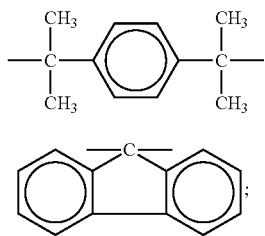
(2)

(2')

a recurring unit of the following formula (4):

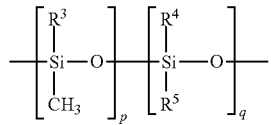
(4)

where:

$R^3$, $R^4$ and $R^5$ are each a hydrogen atom, a $C_1$ to $C_5$ alkyl group, and p and q are each an integer of 0 or at least 1, provided that a total of p and q is an integer of at least 1; and a terminal group represented by formula (5):

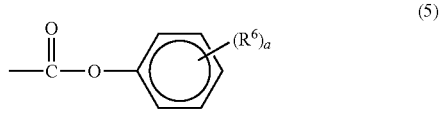
(5)

where:

$R^6$ is a $C_1$ to $C_{35}$ alkyl group, and a is an integer of 0 to 5.

2. The thermoplastic resin composition as defined in claim 1, wherein the polycarbonate resin of ingredient (a-1) has a viscosity average molecular weight in the range of 10,000 to 40,000.

3. The thermoplastic resin composition as defined in claim 1, wherein the rubber-like elastomer of component (B) has an average particle diameter of 100 to 500 nm.

4. An electronic appliance comprising the thermoplastic resin composition as recited in claim 1.

5. A molded body of a thermoplastic resin composition as recited in claim 1.

6. The electronic appliance as defined in claim 4, wherein said electronic appliance is selected from the group consisting of information and communication appliances, home appliances, automobile parts, construction and office automation equipment.

* * * * *